(12) United States Patent
Lim et al.

(10) Patent No.: US 7,680,458 B2
(45) Date of Patent: Mar. 16, 2010

(54) INTERFERENCE CANCELLATION METHOD AND MODULE FOR OFDMA MOBILE COMMUNICATION SYSTEM

(75) Inventors: Kwang-Jae Lim, Daejeon (KR); Chul-Sik Yoon, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom, Inc. (KR)

( * ) Notice: Subject to any disclaimer, the term of this patent is extended or adjusted under 35 U.S.C. 154(b) by 794 days.

(21) Appl. No.: 11/510,085

(22) Filed: Aug. 25, 2006

(65) Prior Publication Data
US 2007/0049199 A1    Mar. 1, 2007

(30) Foreign Application Priority Data

| | | | |
|---|---|---|---|
| Aug. 25, 2005 | (KR) | ............ | 10-2005-0078301 |
| Sep. 7, 2005 | (KR) | ............ | 10-2005-0083208 |
| Jan. 4, 2006 | (KR) | ............ | 10-2006-0000924 |

(51) Int. Cl.
 H04B 1/00    (2006.01)
 H04B 15/00    (2006.01)

(52) U.S. Cl. ............ 455/63.1; 455/67.11; 455/114.2; 455/226.1; 455/226.3; 375/260; 375/326; 375/327; 370/311; 370/347; 370/480

(58) Field of Classification Search ............ 455/423, 455/424, 425, 452.2, 63.1, 67.11, 67.14, 455/570, 114.2, 226.1, 226.3, 278.1, 296; 375/260, 326, 327, 354; 370/311, 347, 480, 370/208, 210, 329
See application file for complete search history.

(56) References Cited

U.S. PATENT DOCUMENTS

| | | | | |
|---|---|---|---|---|
| 6,947,748 B2 * | 9/2005 | Li et al. | ............ | 455/450 |
| 2004/0190637 A1 * | 9/2004 | Maltsev et al. | ............ | 375/260 |
| 2006/0013285 A1 * | 1/2006 | Kobayashi et al. | ............ | 375/132 |

OTHER PUBLICATIONS

Peter Adam Hooeher et al., Single-Antenna Co-Channel Interference Cancellation for TDMA Cellular Radio Systems, IEEE Wireless Communications, Apr. 2005.
Yiqing Zhou et al., Downlink Transmission of Broadband OFCDM Systems—Part 1: Hybrid Detection, IEEE Transactions on Communications, vol. 53, No. 4, Apr. 2005.

* cited by examiner

*Primary Examiner*—Tuan A Pham
(74) *Attorney, Agent, or Firm*—The Farrell Law Firm, LLP

(57) ABSTRACT

The present invention relates to an interference cancellation receiving method in an OFDMA mobile communication system, and an apparatus using the same. For this purpose, the present invention provides an interference cancellation receiving method for outputting a data symbol from which an interfering signal is canceled by receiving subcarriers including a data signal from a serving base station, the data signal including interfering signals from a neighboring base station and a remote base station, estimating a channel response of the serving base station and the neighboring base station by using at least one adjacent pilot subcarrier in the frequency axis or time axis, computing a weight value for canceling the interfering signals, and combining at least one data subcarrier having a repeated identical data symbol among received subcarriers with the weight value. According to the present invention, performance of receiving serving base station signals is improved, and a success rate of handoff is increased and handoff delay time is reduced by successful decoding of signals from a serving base station and a neighboring base station when handoff occurs.

24 Claims, 8 Drawing Sheets

INTERFERENCE CANCELLATION METHOD AND MODULE FOR OFDMA MOBILE COMMUNICATION SYSTEM

BACKGROUND OF THE INVENTION (a) Field of the Invention

The present invention relates to an interference cancellation receiving method for an orthogonal frequency division multiple access (OFDMA)-based mobile communication system, and an apparatus using the same. More particularly, it relates to a method for canceling interference from a neighboring base station or a remote base station when a mobile station located in a cell boundary area receives a data signal from a serving base station in an orthogonal frequency division multiplexing access (OFDMA) mobile communication system.

(b) Description of the Related Art

Regarding signal transmission between a base station and a mobile station in an orthogonal frequency division multiple access (OFDMA) system based on the wideband wireless communication system standard IEEE 802.16, the base station repeatedly transmits encoded data for the mobile station to detect the data even in a bad channel environment.

The mobile station (MS) estimates a channel response by using pilot subcarriers transmitted from the serving base station that transmits data. The MS detects the data by combining the repeated data subcarriers based on the estimated channel response.

As shown in FIG. 1, when the mobile station moves towards the border area between a serving cell (e.g., first base station) and neighboring cells (e.g., second and third base stations), the mobile station receives a signal from the first station and interfering signals from the second and third base stations.

However, a conventional data receiving method uses a limited repeat transmission rate without canceling an interfering signal from a neighboring base station, and therefore, this method needs to have severe interference in a cell boundary area solved.

When the mobile station has a plurality of receive antennas, the interfering signal from the neighboring base station can be cancelled by using a conventional interference cancellation method using multiple receive antennas.

However, it is not easy for a small mobile terminal to be equipped with multiple antennas. Even if the mobile station is equipped with several antennas, correlation between the antennas is high because of small antenna spacing, such that interference cancellation performance could be impaired. Therefore, a method and an apparatus for canceling an interference signal from a neighboring base station must be provided to a mobile terminal using a single antenna.

SUMMARY OF THE INVENTION

The present invention has been made in an effort to provide an interference cancellation receiving method having advantages of canceling interference from a neighboring base station and a remote base station by estimating channel responses through pilot subcarriers and computing combined weights by using the channel response when a mobile station in a cell boundary area receives signals from a serving base station in an OFDM mobile communication system, and an apparatus using the same.

An interference cancellation receiving method according to one embodiment of the present invention is provided for a mobile station to cancel an interfering signal from a neighboring base station. The interference cancellation receiving method includes: (a) receiving subcarriers that contain a data signal from a serving base station, wherein the data signal includes interfering signals from the neighboring base station and a remote base station; (b) estimating a channel response of the serving base station and the neighboring base station by using at least one adjacent pilot subcarrier in the frequency axis or the time axis among the subcarriers; (c) computing weight values for canceling the interfering signals from repeated data subcarriers by using the estimated channel response; and (d) obtaining a data symbol from which the interfering signal is canceled by combining at least one data subcarrier having repeated identical data symbols with the weight values.

An interference cancellation receiving method according to another embodiment of the present invention is provided for a mobile station to cancel interference from a neighboring base station when receiving a data signal from a serving base station to which transmit antenna diversity is applied and that uses two transmit antennas. The interference cancellation receiving method includes: (a) receiving subcarriers that include a data signal from the serving base station, wherein the data signal includes interfering signals from the neighboring base station and a remote base station; (b) estimating a channel response for each transmit antenna of the serving base station and the neighboring base station by using at least one adjacent pilot subcarrier in the frequency axis or time axis among the subcarriers; (c) computing weight values for performing interference cancellation on received symbols of each transmit antenna by using the estimated channel response of each transmit antenna; and (d) obtaining a conjugate of a received symbol received at one transmit antenna, and combining at least one data subcarrier having the same data symbol by using the computed weight values to generate a data symbol from which the interference is cancelled.

An interference cancellation receiving apparatus according to another embodiment of the present invention is provided for a mobile station to cancel an interfering signal from a neighboring base station. The interference cancellation receiving apparatus includes a receive antenna, a Fast Fourier Transform (FFT) module, a joint channel estimation (JCE) module, a weight value computation module, and a joint symbol detection (JSD) module. The receive antenna receives subcarriers that include a data signal from a serving base station, the data signal including the interfering signal from the neighboring base station. The FFT module divides the received subcarriers into a pilot subcarrier and a data subcarrier. The JCE module receives the pilot subcarrier from the FFT module and estimates a channel response of the serving base station and the neighboring base station. The weight value computation module receives the channel response and computes a weight value for the interference cancellation.

DETAILED DESCRIPTION OF THE EMBODIMENTS

Figure 1:
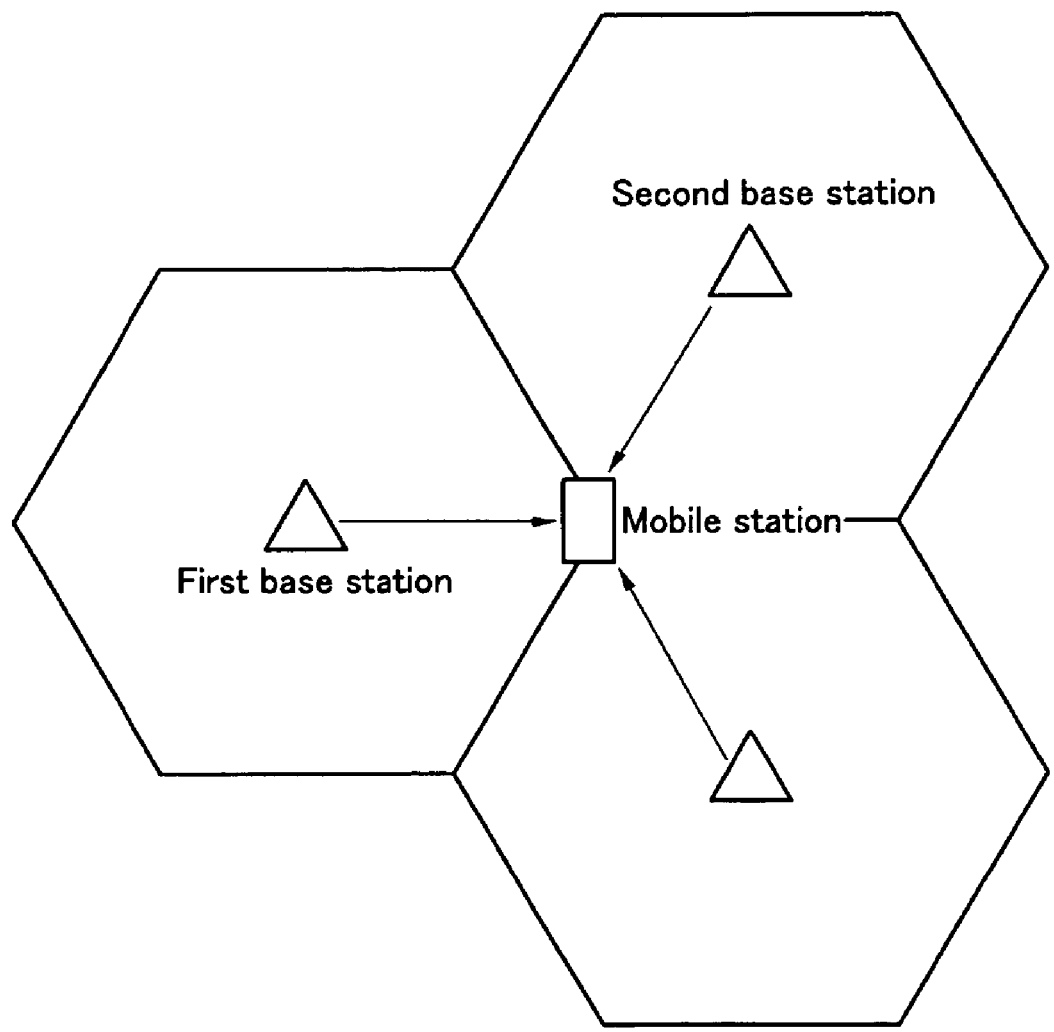
FIG. 1 shows that a mobile station located in a cell boundary area receives a signal from a serving base station while receiving interfering signals from two neighboring base stations.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, throughout this specification and the claims which follow, unless explicitly described to the contrary, the word "comprise" and variations such as "comprises" or "comprising" will be understood to imply the inclusion of stated elements but not the exclusion of any other elements.

In addition, throughout this specification and the claims which follow, a module means a unit that performs a specific function or operation, and can be realized by hardware or software, or a combination of both.

Figure 2:
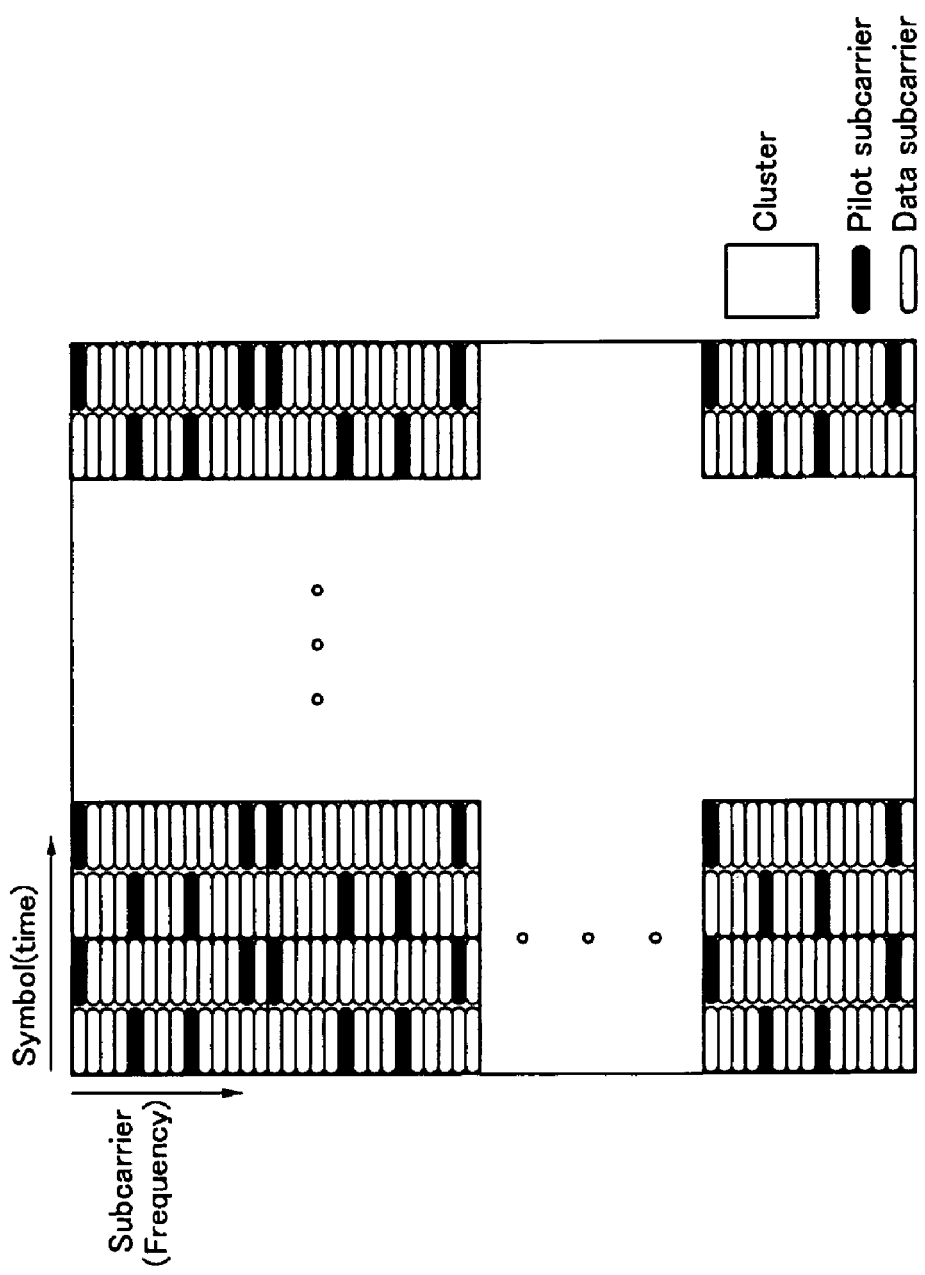
FIG. 2 exemplarily shows a structure of a frame transmitted to a base station from an OFDMA mobile communication system.

FIG. 2 exemplarily shows a structure of a frame transmitted to a base station from an orthogonal frequency division multiple access (OFDMA) mobile communication system.

In FIG. 2, the vertical axis indicates a frequency axis that represents a subcarrier, and the horizontal axis indicates a time axis that represents a symbol.

A frame transmitted from a base station is formed of a plurality of clusters, and each cluster is formed of a data subcarrier and a pilot subcarrier.

In order to increase energy efficiency during data transmission, the base station repeatedly transmits the same data in several data subcarriers. In this case, it is preferred that each base station transmits data subcarriers that contain the same data at the same location. This will be described in more detail with reference to FIG. 4.

Some of pilot subcarriers that form the cluster are used for estimating a channel response used for demodulating a data symbol transmitted in the data subcarrier. It is preferred that pilot subcarriers transmitted from base stations have the same location.

According to a conventional receiving method, a channel response between the corresponding serving base station and a mobile station is estimated and used for demodulation of data transmitted from the serving base station. However, successful data demodulation cannot be guaranteed in a cell boundary area with severe interference in the case that an interfering signal from a neighboring base station cannot be efficiently canceled.

Accordingly, not only a channel response between the serving base station and the mobile station but also a channel response between the neighboring base station and the mobile station must be estimated in order to cancel the interfering signal from the neighboring base station.

Therefore, the mobile station makes a pilot subcarrier group for channel estimation, by grouping $I_f$ adjacent pilot subcarriers in the frequency axis and $I_t$ adjacent pilot subcarriers in the time axis.

Figure 3:
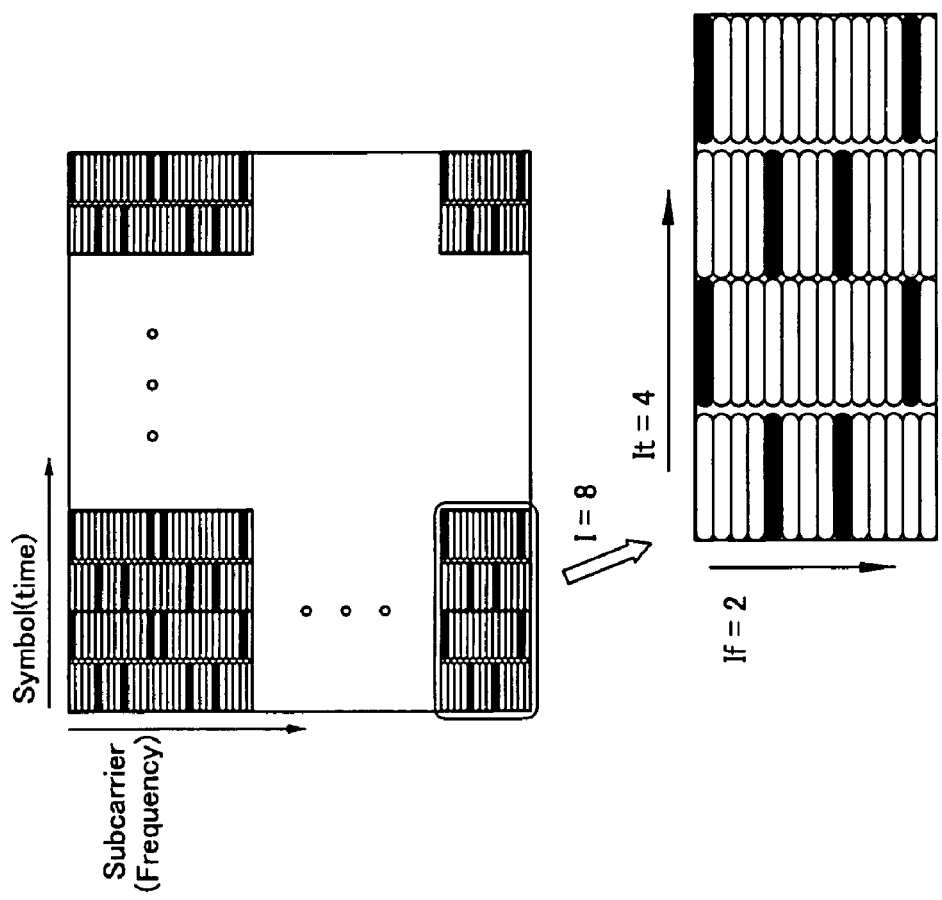
FIG. 3 exemplarily shows a plurality of pilot subcarriers used as one channel estimation group in a channel estimation process.

FIG. 3 shows a plurality of pilot subcarriers grouped as one channel estimation group for estimating the channel response between the base station and the mobile station.

A channel estimation group for estimating a channel response between the base station and the mobile station includes I pilot subcarriers (where $I=I_f \times I_t$). Since the pilot subcarriers in the channel estimation group are adjacent to each other in the frequency axis and the time axis, a channel response is almost constant.

Herein, the channel estimation group of FIG. 3 includes 8 received pilot subcarriers ($I=2\times 4$).

The received pilot signals in one channel estimation group can be represented as given by Equation 1.

$$y_1 = h_1 p_{1,1} + \sum_{j=2}^{J} h_j p_{1,j} + n_1$$

$$\vdots$$

$$y_I = h_1 p_{I,1} + \sum_{j=2}^{J} h_j p_{I,j} + n_I$$

[Equation 1]

where J denotes a sum of the number of serving base station and neighboring base stations that transmit interfering signals to be canceled, $h_j$ denotes a channel response from a base station j, $P_{i,j}$ denotes the i-th transmission pilot symbol, and $n_i$ denotes noise at a location of the i-th pilot symbol and an interfering signal from a remote base station.

Equation 1 can be represented as a matrix of Equation 2.

$$y = Ph + n$$

$$\begin{pmatrix} y_1 \\ y_2 \\ \vdots \\ y_I \end{pmatrix} = \begin{pmatrix} p_{1,1} & p_{1,2} & \cdots & p_{1,J} \\ p_{2,1} & p_{2,2} & \cdots & p_{2,J} \\ \vdots & \vdots & \ddots & \vdots \\ p_{I,1} & p_{I,2} & \cdots & p_{I,J} \end{pmatrix} \begin{pmatrix} h_1 \\ h_2 \\ \vdots \\ h_J \end{pmatrix} + \begin{pmatrix} n_1 \\ n_2 \\ \vdots \\ n_I \end{pmatrix}$$

[Equation 2]

Joint channel estimation (JCE) according to a maximum likelihood (ML) of a channel estimation group can be obtained through Equation 3.

$$\hat{h}_{ML} = (P^H P)^{-1} P^H y$$

[Equation 3]

In Equation 3, the corresponding channel response is estimated by using a pseudo inverse matrix of a transmission pilot symbol that is known from received pilot symbols. For example, when the number of base stations that transmit an interfering signal to be canceled is 1 (i.e., J=2) and a channel estimation group is formed of two pilot subcarriers (i.e., I=2), the corresponding channel response can be estimated from the inverse matrix, as given in Equation 4.

$$h_1 = \frac{p_{2,2} y_1 - p_{2,1} y_2}{p_{1,1} p_{2,2} - p_{1,2} p_{2,1}},$$

$$h_2 = \frac{p_{1,2} y_1 - p_{1,1} y_2}{p_{1,1} p_{2,2} - p_{1,2} p_{2,1}}$$

[Equation 4]

In this case, the number of pilot subcarriers must be equal to or greater than the number of base stations that transmit an interfering signal for the existence of the inverse matrix. That is, I≧J. In addition, it is preferred to set a range of a channel estimation group to be large as long as a channel response is constant over the channel estimation group so as to reduce a channel estimation error due to noise.

However, although I≧J is satisfied in the channel estimation, an inverse matrix may not exist depending on configurations of a pilot symbol. In this case, a channel response of each base station [serving base stations 은하나빔] is independently estimated as given in Equation 5.

$$\hat{h}_j = p_j^{-1} y, \quad j = 1, 2, \ldots, J \quad \text{[Equation 5]}$$

$$\hat{h}_j = \begin{pmatrix} p_{1,j} \\ p_{2,j} \\ \vdots \\ p_{I,j} \end{pmatrix}^{-1} \begin{pmatrix} y_1 \\ y_2 \\ \vdots \\ y_I \end{pmatrix}$$

Figure 4:
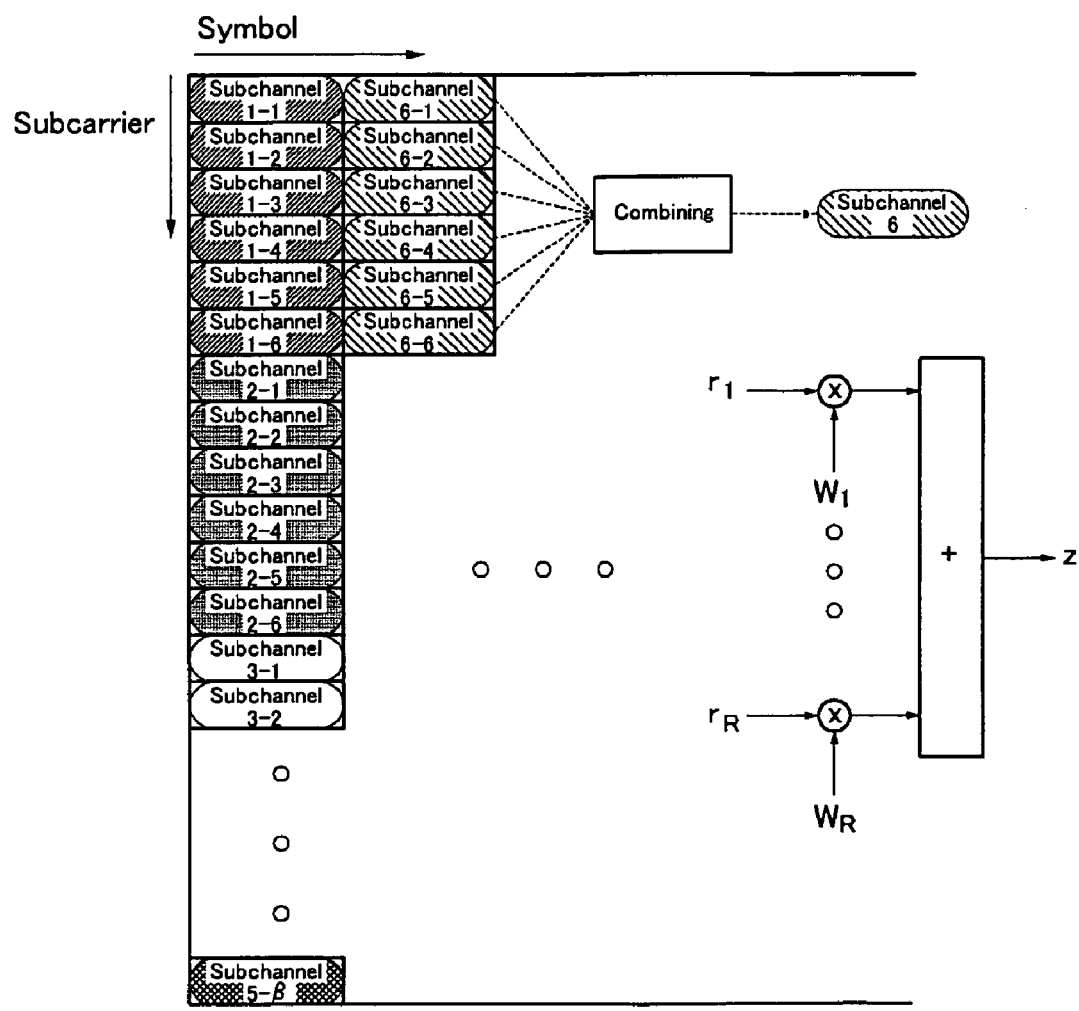
FIG. 4 shows a method for combining repeated sub-channels to one sub-channel.

FIG. 4 shows a process for generating a sub-channel by combining repeated sub-channels.

A sub-channel is formed of a plurality of data subcarriers, and when data subcarrier transmission is repeated R times, sub-channel transmission is also repeated R times. Therefore, transmission of a data subcarrier containing the same data is repeated R times, but each data subcarrier is transmitted at a different location in the frequency axis.

The mobile station combines the data subcarriers that been have received repeatedly R times by multiplying a weight value to each data subcarrier such that a data symbol is detected while canceling an interfering signal from the neighboring base station. At this time, the weight values can be obtained by using channel responses from base stations, estimated through the JCE process. The weight values can be obtained by using a minimum mean square error (MMSE) as given in Equation 6.

$$W = \left[ X^H X + \frac{1}{\gamma} I_J \right]^{-1} X^H \quad \text{[Equation 6]}$$

where $$W = \begin{pmatrix} w_{1,1} & w_{1,2} & \cdots & w_{1,R} \\ w_{2,1} & w_{2,2} & \cdots & w_{2,R} \\ \vdots & \vdots & \ddots & \vdots \\ w_{J,1} & w_{J,2} & \cdots & w_{J,R} \end{pmatrix}$$

$$X = \begin{pmatrix} h_{1,1} c_{1,1} & h_{1,2} c_{1,2} & \cdots & h_{1,J} c_{1,J} \\ h_{1,1} c_{1,1} & h_{2,2} c_{2,2} & \cdots & h_{2,J} c_{2,J} \\ \vdots & \vdots & \ddots & \vdots \\ h_{R,1} c_{R,1} & h_{R,2} c_{R,2} & \cdots & h_{R,J} c_{R,J} \end{pmatrix}$$

$I_J$ denotes an identity matrix diagonal to a J×J matrix with elements of 1, R denotes the number of repetitions, $W_{j,r}$ denotes a weight value for a base station j and a location of the r-th repeated symbol, $h_{r,j}$ denotes a channel response estimated for the base station j at the location of the r-th repeated symbol, $c_{r,j}$ denotes a scrambling chip used in the base station j at the location of the r-th repeated symbol, $X^H$ denotes a conjugate transposed matrix of X, and γ denotes a received signal-to-noise ratio (SNR) (where noise includes signals from remote base stations not to be canceled). The weight values used for detecting signals not only from the serving base but also from the interfering base stations can be obtained by Equation 6. However, when detecting a signal transmitted from only the serving base station, a weight value that corresponds to the serving base station is computed and used. That is, only the j-th row vector $w_j$ in W is used (where j=1).

The weight value obtained by Equation 6 is used for joint detection as shown in Equation 7.

$$z = Wr \quad \text{[Equation 7]}$$

$$\begin{pmatrix} z_1 \\ z_2 \\ \vdots \\ z_J \end{pmatrix} = \begin{pmatrix} w_{1,1} & w_{1,2} & \cdots & w_{1,R} \\ w_{2,1} & w_{2,2} & \cdots & w_{2,R} \\ \vdots & \vdots & \ddots & \vdots \\ w_{J,1} & w_{J,2} & \cdots & w_{J,R} \end{pmatrix} \begin{pmatrix} r_1 \\ r_2 \\ \vdots \\ r_R \end{pmatrix}$$

where $z_j$ denotes a detected data symbol from a base station j, and $r_r$ denotes a value of a data subcarrier received at a location of the r-th repeated symbol.

In Equation 7, a data symbol from a serving base station and data from an interfering base station are simultaneously detected. Therefore, when detecting a signal only from the serving base station, an equation of $z_j = w_j r$ is used.

In addition, differing from Equation 6, a weight value can be obtained by using zero forcing (ZF) through Equation 8.

$$W = (X^H X)^{-1} X^H \quad \text{[Equation 8]}$$

The weight value computation of Equation 8 has an advantage of not using a received SNR but also has a disadvantage of degrading performance due to a low SNR.

Figure 5:
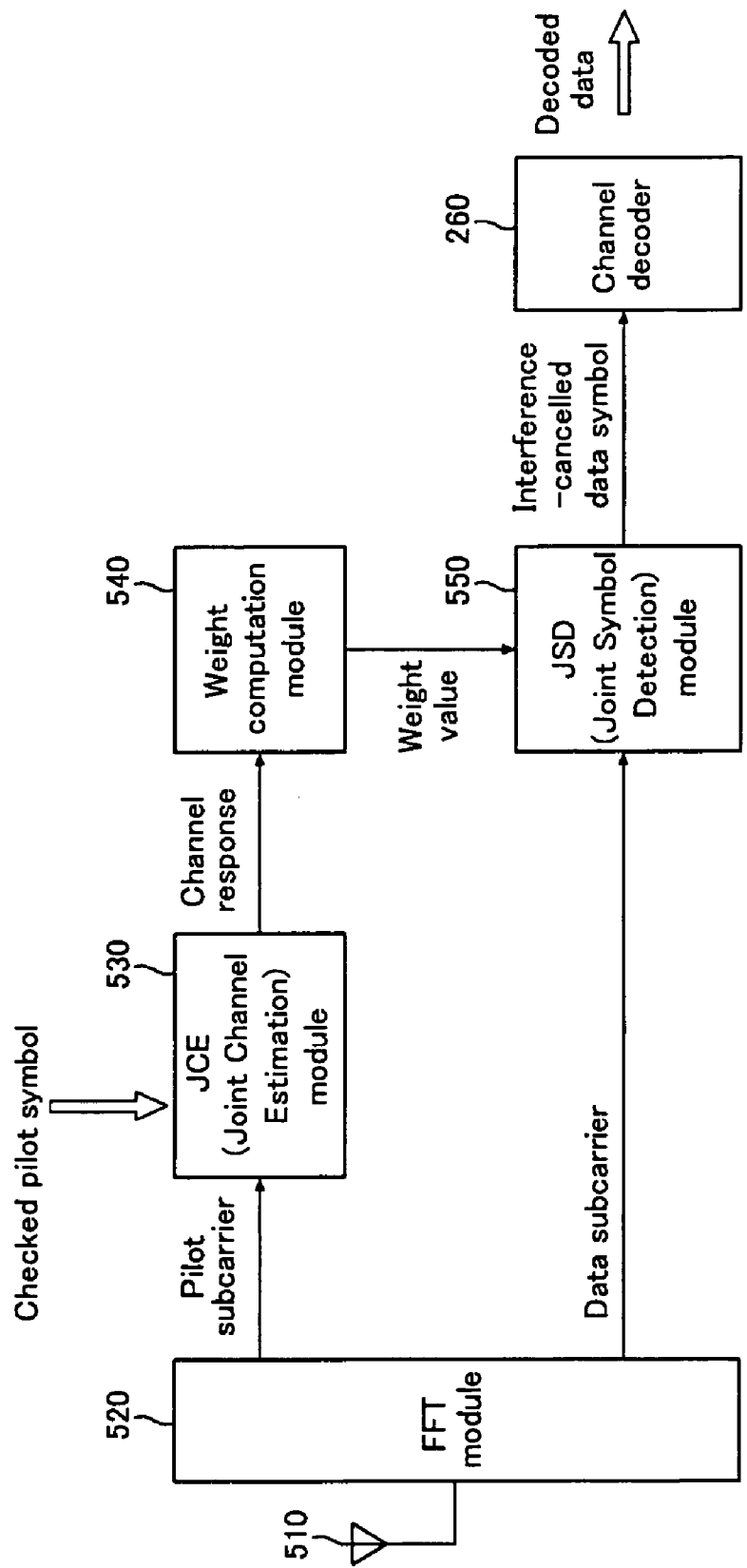
FIG. 5 is a block configuration diagram schematically illustrating an interference cancellation apparatus of a mobile station having a single antenna.

FIG. 5 is a block diagram schematically showing an interference cancellation apparatus of a mobile station having a single antenna according to an embodiment of the present invention.

The interference cancellation apparatus according to the embodiment of the present invention includes a receive antenna 510, a fast Fourier transform (FFT) module 520, a joint channel estimation (JCE) module 530, a weight computation module 540, a joint symbol detection (JSD) module 550, and channel decoding module 560. Herein, conversion of an RF signal to a digital baseband signal is well known to a person of ordinary skill in the art, and therefore a further description related thereto will be omitted.

The receive antenna 510 receives a signal from a serving base station and a signal from a neighboring base station.

The FFT module 520 converts the signal received through the receive antenna 510 and converted to a baseband signal to a frequency domain signal.

In this case, among the converted frequency domain signal, a signal received at a pilot subcarrier location is input to the JCE module 530 and a signal received at a data subcarrier location is input to the JSD module 550.

The JCE module 530 estimates a channel response of a serving base station and an interfering base station by using a received pilot signal and a transmitted pilot symbol of each base station, and forwards the estimated channel response to the weight computation module 540.

The weight computation module 540 computes a weight value for canceling interference by using the channel response forwarded from the JCE module 530.

The JSD module 550 detects a data symbol by canceling interference by using the weight value computed by the weight computation module 540 and the data subcarrier transmitted from the FFT module 520 and outputs the detected data symbol.

The detected data symbol is transmitted to the channel decoding module 560, and the channel decoding module 560 outputs decoded data.

Figure 6:
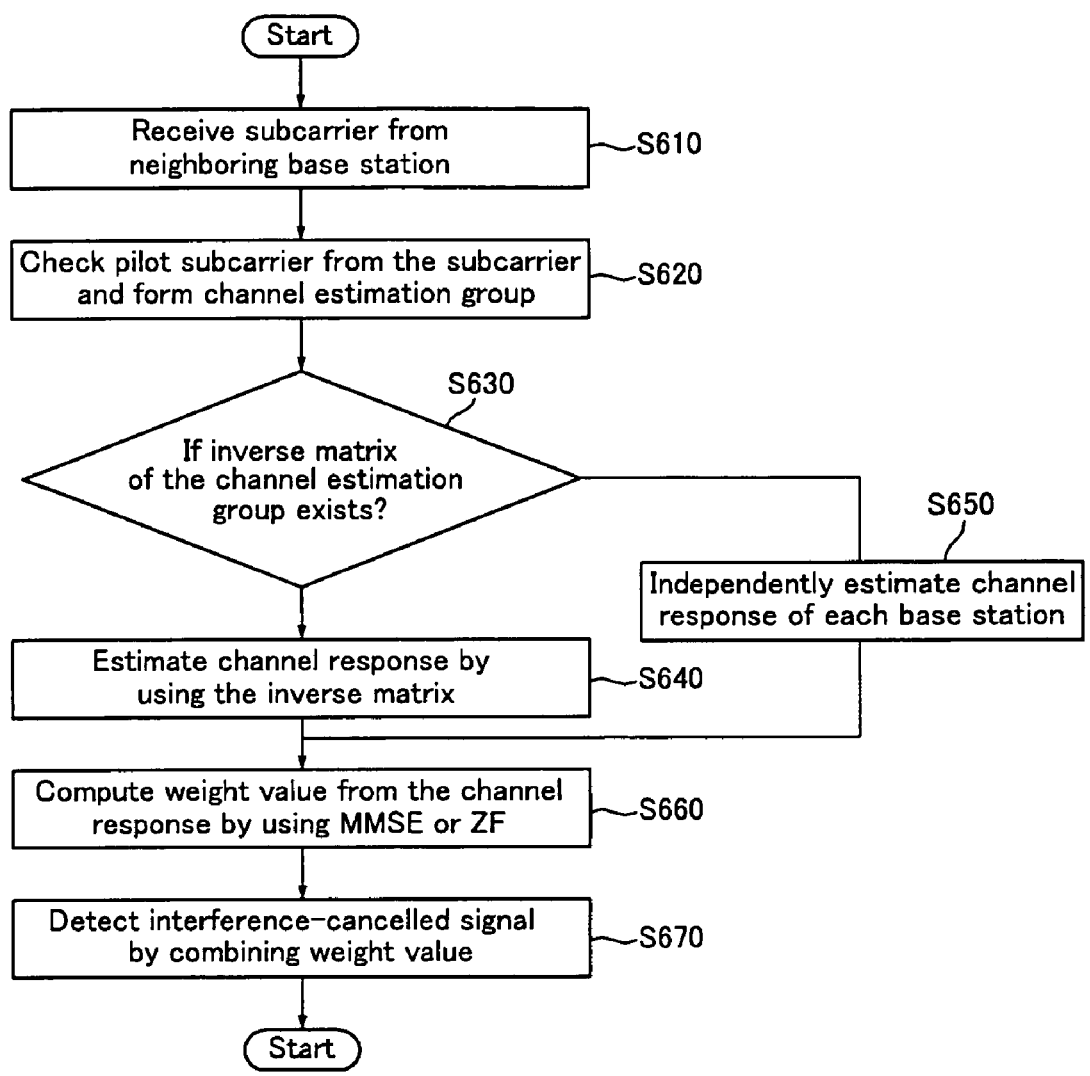
FIG. 6 is a flowchart of an interference cancellation receiving process in the OFDMA mobile communication system according to the exemplary embodiment of the present invention.

FIG. 6 is a flowchart of a process for an interference cancellation receiving method in an OFDMA mobile communication system according to an exemplary embodiment of the present invention.

A mobile station located in a cell boundary area receives subcarriers transmitted from a serving base station and a neighboring base station in step S610.

The mobile station divides the received subcarriers to a pilot subcarrier and a data subcarrier by using the FFT module 520. In addition, the mobile station checks the pilot subcarrier and forms a channel estimation group for estimating a channel response in step S620.

When the channel estimation group is formed, a pilot signal is represented as a matrix of Equation 2 and the existence of an inverse matrix of the channel estimation group is checked through the JCE module 530 in step S630. When the inverse matrix exists, a channel response is estimated through the inverse matrix by using Equation 3 in step S640. Otherwise, a channel response of each base station is independently estimated by using Equation 5 in step S650.

When the channel response is estimated, the weight computation module 540 computes a weight value by employing the MMSE scheme of Equation 6 or the ZF scheme of Equation 8 in step S660.

The JSD module 550 detects a signal from which interference is eliminated by combining weight values as given in Equation 7, in step S670.

According to the above process, the mobile station receives a signal from the serving base station with cancellation of interfering signals from a plurality of base stations in the OFDMA mobile communication system.

The method for interference cancellation according to the embodiment of the present invention may be applied when transmit antenna diversity is applied in a base station that transmits a subcarrier. That is, this method can be applied when multiple antennas are used for transmitting the subcarrier.

Figure 7:
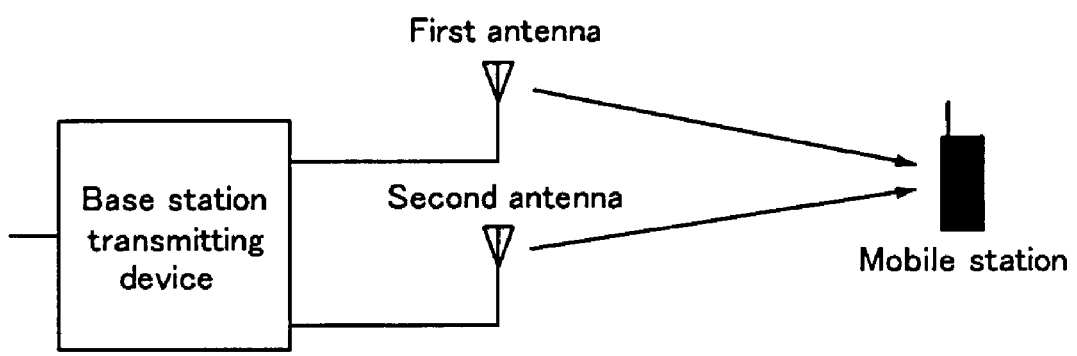
FIG. 7 shows a communication method between a mobile station and a base station to which a transmit antenna diversity is applied.

FIG. 7 shows a method for communicating with a base station to which a transmit antenna diversity is applied.

Assume that the base station transmits subcarriers by using two antennas. The base station of FIG. 7 transmits subcarriers by using a first antenna and a second antenna.

When two transmit symbols are grouped in a unit group, a transmit symbol transmitted at a location of the first symbol is $s_{(1)}$, and a transmit symbol transmitted at a location of the second symbol is $s_{(2)}$, an Alamouti-based 2×2 space-time block code (STBC) transmission matrix can be represented as given by Equation 9.

First antenna  Second antenna the first symbol $s_{(1)}$  $s_{(2)}$ the second symbol $-s_{(2)}^*$  $s_{(1)}^*$  [Equation 9]

In order to consume the same amount of energy as is consumed when the base station uses a signal antenna, half of the energy consumed for transmission through the single antenna is used for transmission through each antenna in Equation 9.

The base station must individually transmit a pilot signal for each antenna to estimate a channel response from each antenna in the mobile station. In general, a pilot symbol is transmitted only through the first antenna at a first symbol location and the pilot symbol is transmitted only through the second antenna at a second symbol location.

When a received symbol at the first symbol location is $v_{(1)}$ and a received symbol at the second symbol location is $v_{(2)}$, symbols received at the mobile station can be represented as given by Equation 10.

$v_{(1)} = h_{(1)}s_{(1)} + h_{(2)}s_{(2)} + n_{(1)}$ $v_{(2)} = -h_{(1)}s^*_{(2)} + h_{(2)}s^*_{(1)} + n_{(2)}$  [Equation 10]

where a channel response from the first antenna to the mobile station is $h_1$, and a channel response from the second antenna to the mobile station is $h_2$. A conjugate of the second received symbol of Equation 10 can be represented as given by Equation 11.

$$\begin{pmatrix} v_{(1)} \\ v^*_{(2)} \end{pmatrix} = \begin{pmatrix} h_{(1)} & h_{(2)} \\ h^*_{(2)} & -h^*_{(1)} \end{pmatrix} \begin{pmatrix} s_{(1)} \\ s_{(2)} \end{pmatrix} + \begin{pmatrix} n_{(1)} \\ n_{(2)} \end{pmatrix}$$ [Equation 11]

$v = H_e s + n$

When detecting a transmit symbol, a channel response is estimated from a pilot symbol transmitted through each antenna, and a channel response matrix $\hat{H}_e$ is generated by using the estimated channel response. Herein, the transmit symbol is detected by using Equation 12.

$\hat{s} = \hat{H}_e^H v$  [Equation 12]

A receiving process in the case that the transmit antenna diversity is applied to the interference cancellation receiving method according to the embodiment of the present invention is as follows.

In order to estimate a channel response of each antenna in a mobile station that receives subcarriers, a base station groups two symbols in a unit, a pilot symbol is transmitted through a first antenna at a first symbol location, and a pilot symbol is transmitted through a second antenna at a second symbol location.

Herein in, in the case of using a transmit channel diversity so as to generate a similar result of the JCE method using a single antenna as given in Equation 3, the JCE method estimates a channel response by using a received pilot symbol for each antenna in each pilot channel estimation group as given in Equation 13.

For the first antenna, $\hat{h}_{(1)} = (P_{(1)}^H P_{(1)})^{-1} P_{(1)}^H y_{(1)}$, and for the second antenna, $\hat{h}_{(2)} = (P_{(2)}^H P_{(2)})^{-1} P_{(2)}^H y_{(2)}$.  [Equation 13]

where $P_{(1)}$ denotes a matrix of a pilot symbol transmitted at the first symbol location, and $P_{(2)}$ denotes a matrix of a pilot symbol transmitted at the second symbol location. In addition, $y_{(1)}$ denotes a matrix of a pilot symbol received at the first symbol location, and $y_{(2)}$ denotes a matrix of a pilot symbol received at the second symbol location.

In this case, each antenna uses a pilot symbol at a different symbol location. Therefore, when a signal antenna is used and a pilot estimation group includes one pilot symbol, each antenna uses half of a received pilot symbol for estimating a channel estimation of each base station and antenna.

As in the case of using a single antenna, a channel response is independently estimated for each antenna and each base station as in Equation 14 when an inverse matrix does not exist in Equation 13.

For the first antenna, $\hat{h}_{j,(1)} = p_{j,(1)}^{-1} y_{(1)}, j = 1, 2, \ldots, J$, and for the second antenna, $\hat{h}_{j,(2)} = p_{j,(2)}^{-1} y_{(2)}, j = 1, 2, \ldots, J$.  [Equation 14]

By using a channel response estimated through Equation 13 and Equation 14 for each base station and for each antenna, a weight value for joint detection (JD) can be computed in the same way as the weight value for a single transmit antenna is computed through Equation 6 or Equation 8. However, the computation of a weight value by using the estimated channel response include a process of detecting symbols transmitted through two transmit antennas of two symbols as given in Equation 15.

In this case, MMSE-based computation of a weight value is achieved through Equation 15.

$$W_e = \left[X_e^H X_e + \frac{1}{\gamma} I_{2,J}\right]^{-1} X_e^H \quad \text{[Equation 15]}$$

$$X_e = \begin{pmatrix} X_{eff,1,1} & X_{eff,1,2} & \cdots & X_{eff,1,J} \\ X_{eff,2,1} & X_{eff,2,1} & \cdots & X_{eff,2,J} \\ \vdots & \vdots & \ddots & \vdots \\ X_{eff,R,1} & X_{eff,R,2} & \cdots & X_{eff,R,J} \end{pmatrix}$$

where $$X_{eff,r,j} = \begin{pmatrix} h_{r,j,(1)} c_{r,j,(1)} & h_{r,j,(2)} c_{r,j,(2)} \\ h_{r,j,(2)} c_{r,j,(1)}^* & -h_{r,j,(1)} c_{r,j,(2)}^* \end{pmatrix},$$

where $h_{r,j,(1)}$ denotes a channel response estimated for a first antenna of a base station j at the r-th repeated symbol location, and $h_{r,j,(2)}$ denotes a channel response estimated for a second antenna of the base station j at the r-th repeated symbol location.

ZF-based weight computation is achieved through Equation 16.

$$W_e = (X_e^H X_e)^{-1} X_e^H \quad \text{[Equation 16]}$$

As described, the weight value computed by Equation 15 or Equation 16 corresponds to a weight value for transmission of two symbols by using two transmit antennas from a base station, and is two times greater than when using a single antenna.

Accordingly, a symbol detection process using this weight value is performed in a unit of two symbols, similar to the JD process. Assume that a second symbol of each group of two symbols is a conjugate of a first antenna, and a transmission symbol is detected by Equation 17.

$$z_e = W_e r_e \quad \text{[Equation 17]}$$

$$\begin{pmatrix} z_{1(1)} \\ z_{1(2)} \\ z_{2(1)} \\ z_{2(2)} \\ \vdots \\ z_{J(1)} \\ z_{J(2)} \end{pmatrix} = \begin{pmatrix} w_{1,1} & w_{1,2} & \cdots & w_{1,R} \\ w_{2,1} & w_{2,2} & \cdots & w_{2,R} \\ \vdots & \vdots & \ddots & \vdots \\ w_{J,1} & w_{J,2} & \cdots & w_{J,R} \end{pmatrix} \begin{pmatrix} r_{1(1)} \\ r_{1(2)}^* \\ r_{2(1)} \\ r_{2(2)}^* \\ \vdots \\ r_{R(1)} \\ r_{R(2)}^* \end{pmatrix}$$

where $z_{j(1)}$ denotes a data symbol at a location of a first symbol detected for the base station j, and $z_{j(2)}$ denotes a data symbol at a location of a second symbol detected for the base station j. In addition, $r_{r(1)}$ denotes a received symbol value at a location of the r-th repeated symbol for the data symbol at the location of the first symbol, and $r_{r(2)}$ denotes a received symbol value at the location of the r-th repeated symbol for the data symbol at the location of the second symbol. Herein, $r_{r(2)}^*$ is a conjugate of $r_{r(2)}$.

Through the above-described embodiments, a method for cancellation of interference from neighboring base stations and a method for interference cancellation when a base station equipped with multiple antennas transmits subcarriers have been described when the mobile station having a single antenna is provided on the cell boundary area.

However, the interference cancellation method can also be applied not only to a mobile station having a single antenna but also to a mobile station having a plurality of antennas.

Figure 8:
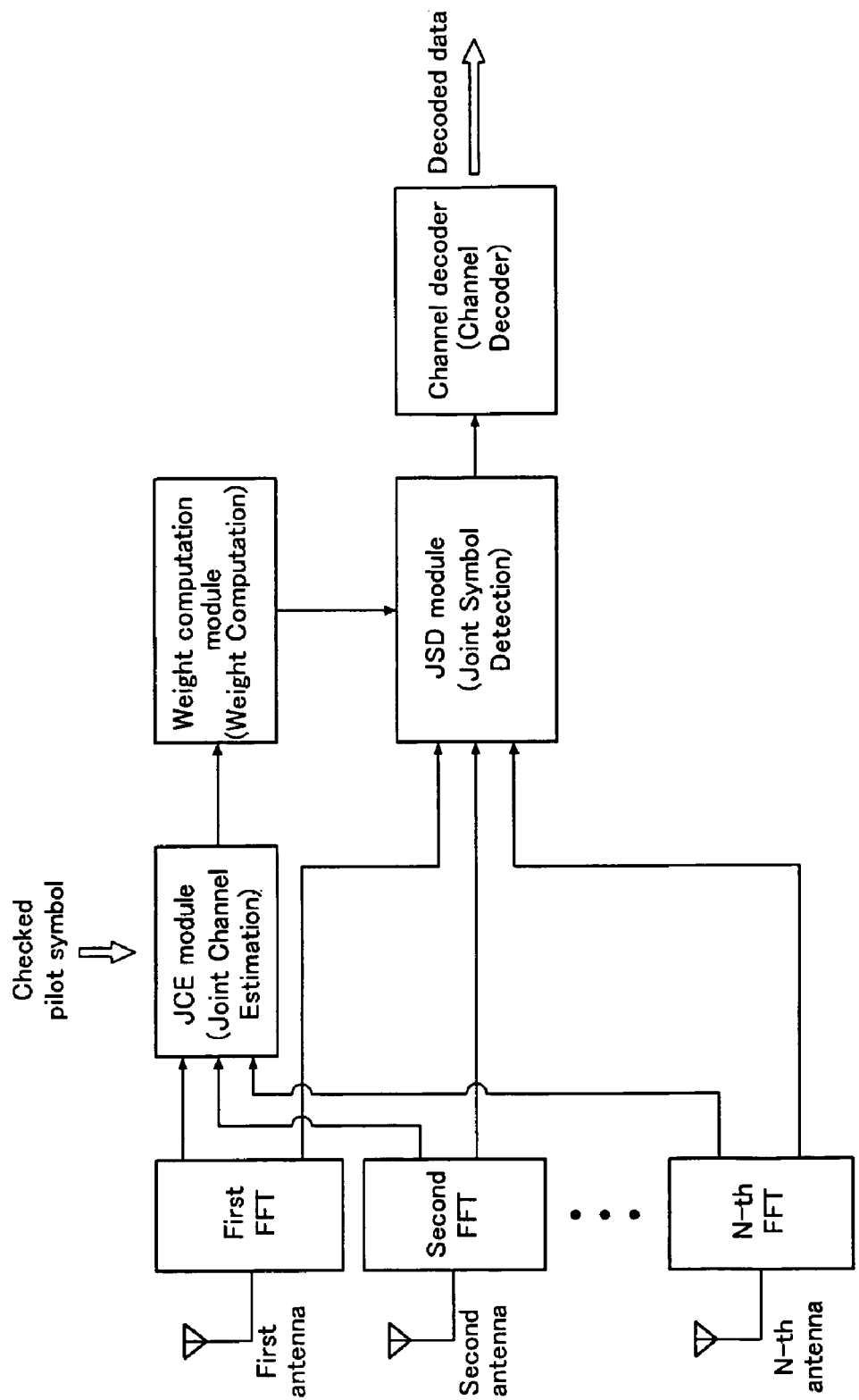
FIG. 8 is a block diagram of an interference cancellation apparatus of a mobile station having multiple antennas.

FIG. 8 is a block diagram of an interference cancellation apparatus of a mobile station having a plurality of antennas.

A mobile station having N antennas forwards subcarriers received through the respective antennas to each FFT module. For this purpose, the mobile station includes N FFT modules. Each FFT module divides a pilot subcarrier and a data subcarrier from the forwarded subcarriers, and forwards the pilot subcarrier to the JCE module. The JCE module estimates an individual channel response for each receive antenna by using a group of N pilot subcarriers forwarded from each FFT module. That is, N channel responses are estimated by the JCE modules.

Accordingly, the weight computation module should expand the number of matrixes for each channel response and each received symbol by the number (N) of receive antennas during a process of weight computation.

In addition, when the JSD module detects a data symbol from which interference is cancelled by applying a weight value, the extended weight value should be applied not only to the repeating symbol but also to the N data subcarriers received through the respective receive antennas so as to detect data symbols with cancellation of interference.

It is illustrated in FIG. 8 that one JCE module receives N pilot subcarrier groups from respective N FFT modules and performs the channel response estimation process N times. However, N JCE modules may be respectively connected to the N FFT modules, and channel responses estimated from the respective JCE modules may be transmitted to one weight value computation module.

In a practical design, it is preferred that the number (N) of antennas is not greater than 2 in order to minimize the size of the mobile station.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the embodiments of the present invention, a mobile station having a single antenna in a cell boundary area may receive signals with cancellation of interference from a neighboring base station such that receiving performance of a signal from a serving base station can be improved, frequency can be reused in all cells, and system capacity can be increased.

In addition, signals from the serving base station and neighboring base stations can be successfully demodulated when the mobile station moves from the cell boundary to the neighboring base station, occurring handoff such that a success rate of handoff can be increased and delay time can be reduced.

What is claimed is:

1. A method for a mobile station to cancel an interfering signal from a neighboring base station, the method comprising:
   (a) receiving subcarriers that contains data signal from a serving base station, wherein the data signal includes interfering signals from a neighboring base station and a remote base station;
   (b) estimating channel responses of the serving base station and the neighboring base station by using at least one pilot subcarrier among adjacent pilot subcarriers on the frequency axis or the time axis;
   (c) computing weight values for canceling the interfering signals from repeated data subcarriers by using the estimated channel response; and
   (d) obtaining a data symbol from which the interfering signal is cancelled by combining at least one data subcarrier among the received subcarriers with the weight value, the at least one data subcarrier having a repeated identical data symbol.

2. The method of claim 1, wherein (b) comprises grouping at least one adjacent pilot subcarrier on the frequency axis or time axis into a channel estimation group, and estimating the channel response by using the channel estimation group.

3. The method of claim 2, wherein, when the number of pilot subcarriers of the channel estimation group is equal to or greater than the number of neighboring base stations, (b) comprises:
   estimating the channel response by using a joint channel estimation method with an inverse matrix in the case that the channel estimation group has an inverse matrix; and
   estimating a channel response of each serving base station and each neighboring base station when the channel estimation group does not have an inverse matrix.

4. The method of claim 3, wherein the joint channel estimation method using the inverse matrix is $$\hat{h}_{ML} = (P^H P)^{-1} P^H y$$

(where $\hat{h}_{ML}$ denotes a vector formed by a channel response $h_j$ of each base station J in a channel estimation group, P denotes $$\begin{pmatrix} p_{1,1} & p_{1,2} & \cdots & p_{1,J} \\ p_{2,1} & p_{2,2} & \cdots & p_{2,J} \\ \vdots & \vdots & \ddots & \vdots \\ p_{I,1} & p_{I,2} & \cdots & p_{I,J} \end{pmatrix},$$

$P_{I,J}$ denotes the I-th transmission pilot symbol for the base station J, and y denotes a vector of a received pilot symbol formed of signals received at a location of the I-th pilot symbol).

5. The method of claim 3, wherein channel responses of the serving base station and the neighboring base station are respectively estimated by using the following equation:

$$\hat{h}_j = p_j^{-1} y, \ j = 1, 2, \ldots, J$$

$$\hat{h}_j = \begin{pmatrix} p_{1,j} \\ p_{2,j} \\ \vdots \\ p_{I,j} \end{pmatrix}^{-1} \begin{pmatrix} y_1 \\ y_2 \\ \vdots \\ y_I \end{pmatrix}$$

(where $\hat{h}_j$ denotes a channel response estimated for a base station j in a channel estimation group, $p_{i,j}$ denotes the i-th transmission pilot symbol for the base station j, and $y_i$ denotes the i-th received pilot symbol).

6. The method of claim 2, wherein when the mobile station receives the subcarriers by using more than two receive antennas, the channel response is calculated for each receive antenna.

7. The method of claim 1, wherein in (c), a minimum mean square error (MMSE) method or a zero forcing (ZF) method is used for weight computation for the interference cancellation.

8. The method of claim 7, wherein the MMSE method uses the following equation for weight computation for the interference cancellation:

$$W = \left[ X^H X + \frac{1}{\gamma} I_J \right]^{-1} X^H$$

(where $$W = \begin{pmatrix} w_{1,1} & w_{1,2} & \cdots & w_{1,R} \\ w_{2,1} & w_{2,2} & \cdots & w_{2,R} \\ \vdots & \vdots & \ddots & \vdots \\ w_{J,1} & w_{J,2} & \cdots & w_{J,R} \end{pmatrix}, X = \begin{pmatrix} h_{1,1} c_{1,1} & h_{1,2} c_{1,2} & \cdots & h_{1,J} c_{1,J} \\ h_{2,1} c_{2,1} & h_{2,2} c_{2,2} & \cdots & h_{2,J} c_{2,J} \\ \vdots & \vdots & \ddots & \vdots \\ h_{R,1} c_{R,1} & h_{R,2} c_{R,2} & \cdots & h_{R,J} c_{R,J} \end{pmatrix},$$

$I_J$ denotes an identity matrix orthogonal to J×J with elements of 1, R denotes the number of repetitions, $w_{j,r}$ denotes a weight value of the r-th repeated symbol location for the base station j, $h_{r,j}$ denotes a channel response estimated for the base station j at the r-th repeated symbol location, $c_{r,j}$ denotes a scrambling chip used in the base station j at the r-th repeated symbol location, $X^H$ denotes a conjugate transposed matrix of X, and $\gamma$ denotes a received signal-to-noise ratio (SNR), and herein, the noise includes interference from a remote base station, excluding interference to be cancelled).

9. The method of claim 7, wherein the ZF method uses the following equation for weight computation for the interference cancellation:

$$W = (X^H X)^{-1} X^H$$

$$W = \begin{pmatrix} w_{1,1} & w_{1,2} & \cdots & w_{1,R} \\ w_{2,1} & w_{2,2} & \cdots & w_{2,R} \\ \vdots & \vdots & \ddots & \vdots \\ w_{J,1} & w_{J,2} & \cdots & w_{J,R} \end{pmatrix}, X = \begin{pmatrix} h_{1,1} c_{1,1} & h_{1,2} c_{1,2} & \cdots & h_{1,J} c_{1,J} \\ h_{2,1} c_{2,1} & h_{2,2} c_{2,2} & \cdots & h_{2,J} c_{2,J} \\ \vdots & \vdots & \ddots & \vdots \\ h_{R,1} c_{R,1} & h_{R,2} c_{R,2} & \cdots & h_{R,J} c_{R,J} \end{pmatrix},$$

$I_J$ denotes an identity matrix orthogonal to J×J with elements of 1, R denotes the number of repetitions, $w_{j,r}$ denotes a weight value of the r-th repeated symbol location for the base station j, $h_{r,j}$ denotes a channel response estimated for the base station j at the r-th repeated symbol location, $c_{r,j}$ denotes a scrambling chip used in the base station j at the r-th repeated symbol location, and $X^H$ denotes a transport and conjugate matrix of X).

10. The method of claim 7, wherein when the mobile station receives the subcarriers by using a plurality of receive antennas, (c) comprises computing a weight value by using a repeated identical data symbol and a channel response of the respective antennas.

11. The method of claim 1, wherein (d) comprises combining a plurality of data subcarriers, each having a repeated identical data symbol among the subcarriers by using the following equation:

$$z = Wr$$

$$\begin{pmatrix} z_1 \\ z_2 \\ \vdots \\ z_J \end{pmatrix} = \begin{pmatrix} w_{1,1} & w_{1,2} & \cdots & w_{1,R} \\ w_{2,1} & w_{2,2} & \cdots & w_{2,R} \\ \vdots & \vdots & \ddots & \vdots \\ w_{J,1} & w_{J,2} & \cdots & w_{J,R} \end{pmatrix} \begin{pmatrix} r_1 \\ r_2 \\ \vdots \\ r_R \end{pmatrix}$$

(where $z_j$ denotes a data symbol detected for the base station j, and $r_r$ denotes a data subcarrier value received at the r-th repeated symbol location).

12. An interference cancellation receiving method for canceling interference from a neighboring base station when a mobile station receives a data signal from a serving base station where two transmit antennas are used and a transmit antenna diversity is applied, the interference cancellation receiving method comprising:

(a) receiving subcarriers including a data signal from the serving base station, the data signal including interfering signals from the neighboring base station and a remote base station;

(b) estimating a channel response for each transmit antenna of the serving base station and the neighboring base station by using at least one adjacent pilot subcarrier on the frequency axis or time axis among the subcarriers;

(c) computing a weight value for performing interference cancellation on a received symbol of each transmit antenna by using the channel response estimated for each transmit antenna; and (d) obtaining a conjugate of a received symbol received at one transmit antenna, and combining at least one data subcarrier having the same data symbol by using the weight value, to generate a data symbol from which the interference is cancelled.

13. The interference cancellation receiving method of claim 12, wherein in (b), the number of adjacent pilot subcarriers in the frequency axis or the time axis is equal or 2 times greater than the number of serving base stations and neighboring base stations.

14. The interference cancellation receiving method of claim 12, wherein the channel response for each transmit antenna in (b) is calculated by using the following equation:

for the first antenna, $\tilde{h}_{(1)} = (P_{(1)}^H P_{(1)})^{-1} P_{(1)}^H y_{(1)}$, and for the second antenna, $\tilde{h}_{(2)} = (P_{(2)}^H P_{(2)})^{-1} P_{(2)}^H y_{(2)}$ (where $P_{(1)}$ denotes a matrix of a pilot symbol transmitted at the first symbol location, $P_{(2)}$ denotes a matrix of a pilot symbol transmitted at the second symbol location, $y_{(1)}$ denotes a matrix of a pilot symbol received at the first symbol location, and $y_{(2)}$ denotes a matrix of a pilot symbol received at the second symbol location).

15. The interference cancellation receiving method of claim 13, wherein, when the $P_1$ or $P_2$ does not have an inverse matrix, the channel response for each transmit antenna is calculated by using the following equation:

for the first antenna, $\tilde{h}_{j,(1)} = p_{j,(1)}^{-1} y_{(1)}$, j=1,2,..., J, and for the second antenna, $\tilde{h}_{j,(2)} = p_{j,(2)}^{-1} y_{(2)}$, j=1,2,... J.

16. The interference cancellation receiving method of claim 12, wherein, when the mobile station receives the subcarriers by using more than two receive antennas, the channel response of each transmit antenna is calculated for each receive antenna.

17. The interference cancellation receiving method of claim 12, wherein in (c), the weight value is computed by using a minimum mean square error (MMSE) method of the following equation:

$$W_e = \left[ X_e^H X_e + \frac{1}{\gamma} I_{2J} \right]^{-1} X_e^H$$

$$X_e = \begin{pmatrix} X_{eff,1,1} & X_{eff,1,2} & \cdots & X_{eff,1,J} \\ X_{eff,2,1} & X_{eff,2,1} & \cdots & X_{eff,2,J} \\ \vdots & \vdots & \ddots & \vdots \\ X_{eff,R,1} & X_{eff,R,2} & \cdots & X_{eff,R,J} \end{pmatrix}$$

$$X_{eff,r,j} = \begin{pmatrix} h_{r,j,(1)} c_{r,j,(1)} & h_{r,j,(2)} c_{r,j,(2)} \\ h_{r,j,(2)}^* c_{r,j,(1)} & -h_{r,j,(1)}^* c_{r,j,(2)} \end{pmatrix},$$

(where $h_{r,j,(1)}$ denotes a channel response estimated for a first antenna of a base station j at the r-th repeated symbol location, and $h_{r,j,(2)}$ denotes a channel response estimated for a second antenna of the base station j at the r-th repeated symbol location).

18. The interference cancellation receiving method of claim 12, wherein in (c), the weight value is computed by using a zero forcing (ZF) method of the following equation:

$$W_e = (X_e^H X_e)^{-1} X_e^H$$

$$X_e = \begin{pmatrix} X_{eff,1,1} & X_{eff,1,2} & \cdots & X_{eff,1,J} \\ X_{eff,2,1} & X_{eff,2,1} & \cdots & X_{eff,2,J} \\ \vdots & \vdots & \ddots & \vdots \\ X_{eff,R,1} & X_{eff,R,2} & \cdots & X_{eff,R,J} \end{pmatrix}$$

$$X_{eff,r,j} = \begin{pmatrix} h_{r,j,(1)} c_{r,j,(1)} & h_{r,j,(2)} c_{r,j,(2)} \\ h_{r,j,(2)}^* c_{r,j,(1)} & -h_{r,j,(1)}^* c_{r,j,(2)} \end{pmatrix}$$

(where $h_{r,j,(1)}$ denotes a channel response estimated for a first antenna of a base station j at the r-th repeated symbol location, and $h_{r,j,(2)}$ denotes a channel response estimated for a second antenna of the base station j at the r-th repeated symbol location).

19. The interference cancellation receiving method of claim 12, wherein in (d), a data symbol from which interference is cancelled is output by using the following equation:

$$z_e = W_e r_e$$

$$\begin{pmatrix} z_{1(1)} \\ z_{1(2)} \\ z_{2(1)} \\ z_{2(2)} \\ \vdots \\ z_{J(1)} \\ z_{J(2)} \end{pmatrix} = \begin{pmatrix} w_{1,1} & w_{1,2} & \cdots & w_{1,2R} \\ w_{2,1} & w_{2,2} & \cdots & w_{2,2R} \\ \vdots & \vdots & \ddots & \vdots \\ w_{2J,1} & w_{2J,2} & \cdots & w_{2J,2R} \end{pmatrix} \begin{pmatrix} r_{1(1)} \\ r^*_{1(2)} \\ r_{2(1)} \\ r^*_{2(2)} \\ \vdots \\ r_{R(1)} \\ r^*_{R(2)} \end{pmatrix}$$

(where $z_{j(1)}$ denotes a data symbol at a location of a first symbol detected for the base station j, $z_{j(2)}$ denotes a data symbol at a location of a second symbol detected for the base station j, $r_{r(1)}$ denotes a received symbol value at a location of the r-th repeated symbol for the data symbol at the location of the first symbol, and $r_{r(2)}$ denotes a received symbol value at the location of the r-th repeated symbol for the data symbol at the location of the second symbol, and herein, $r^*_{r(2)}$ is a conjugate of $r_{r(2)}$).

20. An interference cancellation receiving apparatus for a mobile station to cancel an interfering signal from a neighboring base station, the interference cancellation receiving apparatus comprising:
 a receive antenna for receiving subcarriers that include a data signal from a serving base station, the data signal including the interfering signal from the neighboring base station;
 a fast Fourier transform (FFT) module for dividing the received subcarriers into a pilot subcarrier and a data subcarrier;
 a joint channel estimation (JCE) module for receiving the pilot subcarrier from the FFT module and estimating a channel response of the serving base station and the neighboring base station;
 a weight value computation module for receiving the channel response and computing a weight value for the interference cancellation; and
 a joint symbol detection (JSD) module for receiving the weight value from the weight value computation module and outputting the data symbol from which the interference is canceled.

21. The interference cancellation receiving apparatus of claim 20, wherein the interference cancellation receiving apparatus receives the subcarriers from the serving base station and the neighboring base station through a plurality of receive antennas.

22. The interference cancellation receiving apparatus of claim 21, wherein the interference cancellation receiving apparatus has the same number of FFT modules as that of receive antennas, and the respective FFT modules are connected to the receive antennas respectively and divide subcarriers received through the respective receive antennas into a pilot subcarrier and a data subcarrier.

23. The interference cancellation receiving apparatus of claim 22, wherein the interference cancellation receiving apparatus has the same number of JCE modules as that of FFT modules, and the respective JCE modules receive the pilot subcarriers divided by the respective FFT modules and estimate respective channel responses.

24. The interference cancellation receiving apparatus of claim 20, further comprising a channel decoding module for decoding the data symbol from which the interference is cancelled, and outputting decoded data.

* * * * *